Sept. 29, 1925.
F. W. SCHROEDER
1,555,718
SPARKING PLUG
Filed May 28, 1923
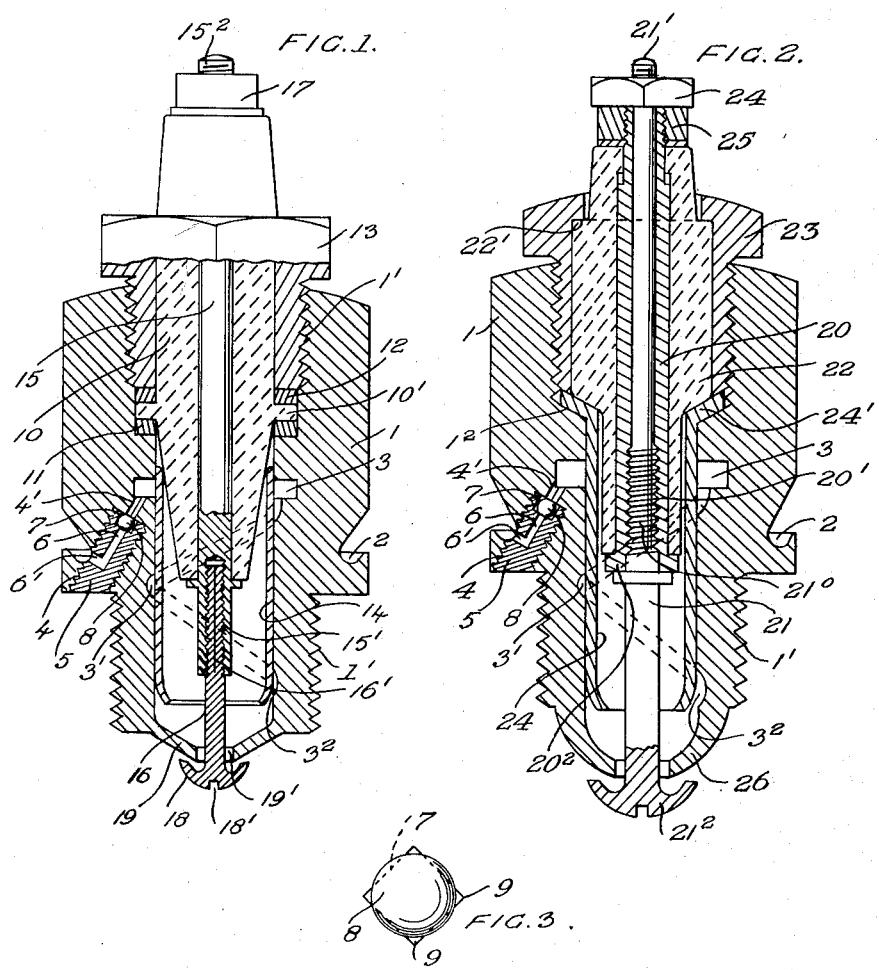

Patented Sept. 29, 1925.

1,555,718

UNITED STATES PATENT OFFICE.

FREDERICK WILLIAM SCHROEDER, OF LONDON, ENGLAND.

SPARKING PLUG.

Application filed May 28, 1923. Serial No. 642,037.

*To all whom it may concern:*

Be it known that I, FREDERICK WILLIAM SCHROEDER, a subject of the King of Great Britain, residing in London, England, have invented certain new and useful Improvements Relating to Sparking Plugs, of which the following is a specification.

My invention relates to improvements in sparking plugs of the character wherein air may be passed through the plug and through the space around the extremities of its sparking electrodes and into the engine cylinder by way of an external groove or gutter and a valved duct connected with the gutter and communicating with an internal groove which is formed on the inner face of the plug casing.

A further improvement resides in the valved duct, which is constructed and arranged as hereinbelow described.

The invention will be described with reference to the accompanying drawings, in which:—

Fig. 1 is a sectional elevation of one form of the sparking plug having the invention applied.

Fig. 2 is a vertical section of a modified form of the plug, and

Fig. 3 is an enlarged detail.

In both Figs. 1 and 2 of the drawings, 1 denotes the hollow metal plug casing which is adapted to be screwed by means of its threaded part 1' into the combustion chamber of the engine cylinder with which the plug is to be used. On the outside of the casing is formed a gutter 2 which is capable of holding a small quantity of petrol which at times, when the weather is cold, may be introduced or injected into it from outside the casing for the purpose of facilitating the starting of the engine by drawing the petrol into the engine cylinder. On the inside of the casing is an annular groove 3 which is provided with an extension 3' which may be spirally directed as shown, and between the groove 3 and the gutter 2 is provided a passage that is inclined to the axis of the plug. The outer end portion 4 of the passage is circular in cross section and is screw-threaded, and the inner end portion 4' is of reduced cross sectional area, and is in section preferably of square shape. Into the outer end portion 4 of the inclined passage is screwed a plug 5 which for a portion of its length has an axial bore hole 6 which at the inner end of the plug is enlarged to constitute a chamber 7 to receive a ball valve 8, for controlling the entry to the duct portion 4', the size of the chamber 7 being such as will allow of slight movement on the part of the ball valve 8 between the inner end of the bore or duct 6 and the outer end of the passage 4'. The duct 6 at its outer end is formed with a branch 6' that opens on to the gutter 2. The ball valve 8, when not subjected to the suctional action of the engine, will automatically under gravitational action seat itself against and close the inner end of the duct 6. When the piston in the cylinder to which the plug is attached commences its suction stroke the ball 8 will be drawn from its seating to a position wherein it tends to close the passage 4'. By making the passage of rectangular or square cross section clearances such as those indicated at 9 in Fig. 3 will be provided for the flow of air or petrol from the gutter, to passage 4', if the diameter of the ball and the side of the square be properly proportioned.

In Fig. 1 an insulating core or member 10 having a collar 10', is shown as arranged axially within the casing and is retained in proper position, with the collar interposed between a pair of washers or packings 11 and 12, by means of the clamping nut 13 screwed into the central opening 1' of the casing 1 which is threaded for the purpose along a portion of its length. In the arrangement shown in the figure an internally disposed sleeve piece 14, which may be held in position in the lower portion of the central opening 1' by means of a set screw or in other suitable known manner, is provided to mask or cover the annular groove 3 and its spiral extension 3' with the exception of the outlet end portion of the latter, whereby the groove is converted into a closed conduit with an unobstructed outlet at 3².

The central electrode preferably comprises two detachably connected co-axial parts 15 and 16, respectively termed hereinafter the upper and lower electrode portions. The upper electrode portion 15 which passes through the insulating member or block 10 is of solid construction and is provided at its lower end with an axially disposed threaded bore 15' into which is screwed the upper end of the lower electrode portion 16 which would be threaded for the purpose.

With the object of forming a tight joint, the upper end of the lower portion may be split as indicated at 16', Fig. 1, and be outwardly flared. The upper portion 15 is of such a length that a part 15² of it will project above the top of the clamping nut 13. The projection 15² is screw-threaded for the reception of a nut 17 which bears against the clamping nut 13 and holds the electrode portion 15 in proper position. The lower or free end of the lower electrode portion 16 may be in the form of a circular disc or hood 18, and the edge of this may be notched, the projecting parts between the notches being upwardly turned. The part 18 may be provided with a slot 18' for co-operation with a tool for turning the electrode portion 16. The outer or earth electrode may be an integral part of the lower end of the casing 1 and may have the shape of a dome 19 with a central opening or eye 19', and the circular disc or hood 18 on the central electrode is preferably so formed that it will screen the central opening 19' of the outer electrode, prevent any ingress of oil or other matter, and obviate carburization and oxidation taking place inside the plug.

The plug shown in Fig. 2 comprises parts corresponding with the parts numbered 1 to 9 in the plug shown in Fig. 1, which parts are similarly numbered in Fig. 2. The plug in Fig. 2 differs from that shown in Fig. 1 in that the construction and arrangement of its two-part central electrode 20, 21, insulating block 22, clamping nut 23, and sleeve piece 24, are modified. The upper electrode portion 20 is tubular and is internally screw-threaded as shown at 20', and the lower electrode portion 21 is provided between its ends with screw threads 21º for co-operation with the thread 20'. The member 21 is of sufficient length to pass through the tubular portion 20 and protrude through the upper end thereof and at the same time depend below the lower end of the plug casing 1. For fixing the portion 21 in position it may be screw-threaded at its upper protruding end 21' for co-operation with a nut 24 that may be arranged to bear on nut 25 carried by the upper end of the electrode tubular portion 20. The lower end 21² of the electrode portion 21 may be shaped in the manner above described with reference to the electrode end 18 in Fig. 1. The tubular portion at its lower end 20² may be flanged for supporting the insulating block 22 that surrounds it. The block 22 is provided with a reduced upper end and a shoulder 22' on which bears the clamping nut 23 which is screwed into the central opening of the casing 1 and thereby holds the insulating block and other parts in position.

The outer electrode 26 may be formed in the same manner as that described above with respect to the outer or earth electrode 19 in Fig. 1.

In Fig. 2 the sleeve 24 is flanged, the flange 24' being arranged to bear on a shouldered portion 1², and the flange is engaged by a shouldered part of the insulating block 22, which when secured in the casing 1 holds the sleeve in position.

When the piston in the cylinder to which the plug is attached makes a suction stroke, the ball valve 8 will be drawn away from its seating, thus closing the outlet of the bore or passage 6 towards the inlet to the duct 4' so that air will be drawn through the bore 6 and duct 4' into the annular groove 3 and its extension 3', wherein it will become heated through the agency of the surrounding heated parts of the plug before it is drawn into the internal chamber of the plug and through the space in which the extremities of the electrode are located and before it enters the engine cylinder.

Having thus described the nature of the said invention and the best means I know of carrying the same into practical effect, I claim:—

1. A sparking plug of the character referred to comprising in combination, a casing having an external annular groove open to the air and an internal groove and also having a passage extending between said grooves, said passage comprising an outer portion and an inner portion, said inner portion constituting a duct having a cross sectional area smaller than the cross sectional area of the outer passage portion, means for conducting air to the internal groove, said means comprising a plug fitted in the outer portion of the passage and provided at its inner end with a chamber communicating with said duct and also having a bore communicating with the chamber and extending towards the outer end of the plug, said bore having an offset branch communicating with the external annular groove, and a ball mounted with to move freely in said chamber, said ball adapted normally to close the upper end of the bore and under suctional action of the engine to withdraw from the end of the bore and obturate the duct.

2. A sparking plug according to claim 1, wherein the duct is of square-shaped cross-section.

In testimony whereof I have signed my name to this specification.

FREDERICK WILLIAM SCHROEDER.